United States Patent [19]

Williams

[11] 4,351,877
[45] Sep. 28, 1982

[54] MULTIPLE LAYERED LAMINATED STRIPPABLE TAPE

[76] Inventor: Robert E. Williams, 9104 Rott Rd., St. Louis, Mo. 63127

[21] Appl. No.: 194,568

[22] Filed: Oct. 6, 1980

[51] Int. Cl.$^3$ ............................ C09J 7/02; B32B 23/08; B32B 27/10
[52] U.S. Cl. ........................................ 428/350; 428/40; 428/42; 428/507; 428/511
[58] Field of Search ................... 428/350, 343, 40, 41, 428/43, 507, 511, 513, 42, 138

[56] References Cited

U.S. PATENT DOCUMENTS

| | | | |
|---|---|---|---|
| 2,895,865 | 7/1959 | Humphner | 428/350 X |
| 3,275,469 | 9/1966 | Streit | 428/350 |
| 4,041,202 | 8/1977 | Williams | 428/138 |
| 4,055,698 | 10/1977 | Beery | 428/350 X |

Primary Examiner—Thomas J. Herbert, Jr.
Attorney, Agent, or Firm—Rogers, Eilers & Howell

[57] ABSTRACT

A multiple layered laminated tape has an upper strength layer made of a film of pre-stretched polypropylene or the like which is laminated to a very weak lower carrier layer of relatively thin low internal bond Kraft paper. The carrier layer has a coating of a water soluble adhesive which is used to apply the tape to separable portions of a cardboard carton or the like. The carrier layer serves only as a medium to "carry" the water soluble adhesive and also to provide sufficient longitudinal rigidity to permit dispensing of the tape from a standard Kraft paper type tape dispensing machine. Stripping the tape from a carton pulls away the upper plastic layer and may split the Kraft carrier layer that has low internal bond, leaving only so thin a layer of Kraft on the carton that it can very easily be broken to permit opening of the carton.

5 Claims, 4 Drawing Figures

MULTIPLE LAYERED LAMINATED STRIPPABLE TAPE

BACKGROUND AND SUMMARY

Multiple layered strippable adhesive tapes for sealing carton flaps for joints during manufacture or after being filled are well known in the art. Various types of these tapes have been developed over the years to meet different applications and satisfy different requirements in sealing. Indeed, applicant is the inventor of one such tape disclosed and claimed in U.S. Pat. No. 4,041,202 issued Aug. 9, 1977, incorporated herein by reference. That invention solved many problems in the prior art and provided a delaminatable tape which could be stripped away to leave two lateral portions of a bottom layer separated on the two sides of a joint to thereby release the pieces being joined.

Generally in the prior art these multiple layered tapes have reinforcing fibers, perhaps made of fiberglass or the like, extending laterally across the tape to increase its strength. This type of construction results in a somewhat rough and uneven surface along both the top and bottom of the tape, as well as a somewhat thicker tape. Not only does this decrease the flexibility of the tape as the reinforcing fibers resist any folding or twisting of the tape from its flattened orientation, but it also increases the diameter of a roll of tape as the uneven surfaces do not closely wrap atop each other. Furthermore, the relative inflexibility and uneven surfaces reduce the effectiveness of the tape in adhering to the roughened surface of a carboard box or carton as the tape is less able to conform to the surface of the carton and instead exerts a tension against the adhesive tending to return the tape to its original orientation and separate it from the carton surface, which may itself be rough and uneven. Of course, the compound structure involving the use of fiberglass twine and high strength Kraft paper or the like makes for a high strength tape capable of withstanding much higher stress and loading, but it also represents a significantly higher cost factor than that of simple Kraft paper tape.

Plastic tapes are also known in the prior art and provide many advantages when used as the strength layer in a delaminatable tape as mentioned above. However, an inherent problem with using plastic is that it cannot hold a water soluble adhesive. Furthermore, a rather thin film of plastic may be used as the strength layer to achieve the same characteristics of much thicker prior art tapes, but this thinness becomes a disadvantage in that it prevents its being dispensed by standard Kraft paper tape dispensing machines which rely upon the longitudinal stiffness of the tape to unwind it from the roll and force it through the dispenser. Of course, most Kraft paper type dispensers also have a water reservoir or the like which moistens the adhesive surface of the tape and ready it for application. Thus, a water soluble adhesive is virtually a necessity as well.

Accordingly, applicant has combined the advantages of a plastic strength layer in a delaminatable tape by utilizing a relatively thin carrier layer of Kraft paper or the like which is coated with a water soluble adhesive and provides sufficient rigidity to the tape so that it can be dispensed from the standard Kraft paper type tape dispenser. As the plastic film provides the necessary strength, the carrier layer need only be sufficiently thick to provide the minimum rigidity required to "stiffen up" the tape for dispensing. Thus, a significant reduction in thickness can be achieved with plastic as the strength layer. No minimum thickness is required to satisfy the function of "carrying" the water soluble adhesive as the lamination between the carrier layer and the strength layer can be sufficiently strong to anchor them in place and help prevent the disintegration of the carrier.

As can be appreciated, the plastic film is substantially thinner, smoother, and thus results in much greater flexibility and bonding between the tape and the carton surface. Furthermore, a thin layer of plastic provides much greater strength than the construction of prior art tapes. By pre-stretching and orienting the strength layer of the tape, inadvertent and undesired separation of the strength layer from the carrier layer due to their different flexibilities is avoided. This also reduces the tension on the lamination between the two layers and helps maintain its integrity as the pieces of the carton joined by the tape move and flex in response to its use.

All of the inherent advantages provided by a plastic tape having a water soluble adhesive and sufficient rigidity for dispensing are available in a strippable tape with applicant's invention. These include the ability to manufacture the tape at much greater speed than prior art constructions as the fiberglass threads are eliminated from its construction. The cost is significantly reduced because of its relative simplicity of construction and utilization of fewer and less expensive materials. The plastic, which may be any polymer or co-polymer, is much more flexible than prior multiple layer constructions and adheres much better to the carton or the like. As the tape is substantially thinner, and also provides a smooth flattened surface across its width, it may be wound with much greater efficiency into rolls such that approximately twice as much of applicant's tape can fit within the space required by the prior art fiberglass reinforced tape.

In applicant's preferred embodiment, the carrier layer may be made of a thin low internal bond Kraft which partially separates internally with the stripping of the upper strength layer so that any carrier layer that remains on the carton is so weak that it may be easily broken to permit opening of the carton. While the invention may also employ a medial slit cut into the carrier layer which would form a line of separation as the upper strength layer is stripped from the tape, this is not necessary and is only a matter of choice.

Applicant's tape is described herein in connection with its use in either manufacturing or closing cardboard cartons. However, it is to be understood that such use is only one of many types of uses suitable for applicant's tape and is not to be considered a limiting feature thereof. Some of the unique features and advantages of applicant's tape have been described above. Further and more detailed explanation leading to a more complete understanding of applicant's invention may be had by reviewing the drawing and preferred embodiment which follows.

DETAILED DESCRIPTION OF THE PREFERRED EMBODIMENT

Figure 1:
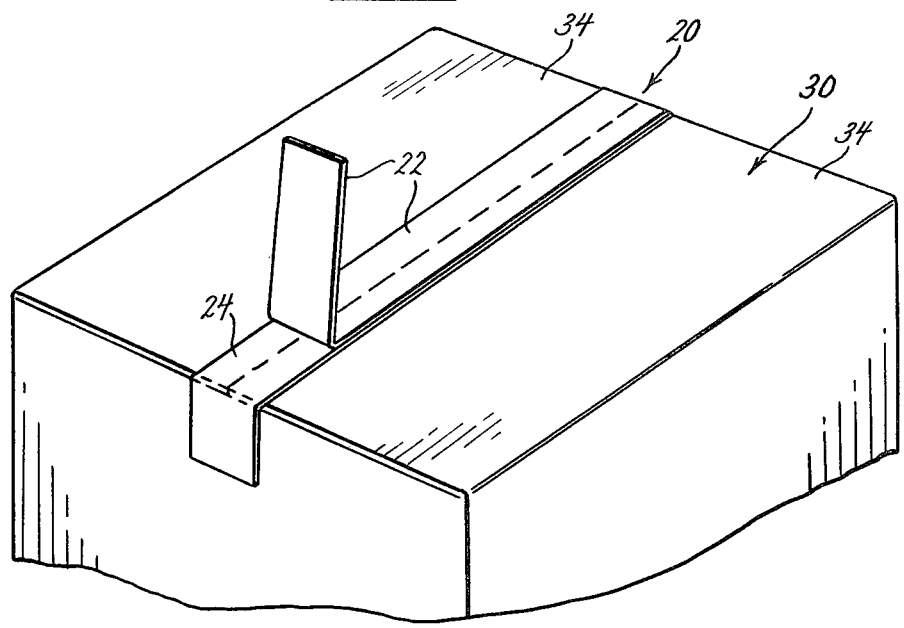
FIG. 1 is a perspective view of applicant's tape applied to seal the separable flaps of a carton, with the upper strength layer partially stripped away to expose the lower carrier layer.
Figure 2:
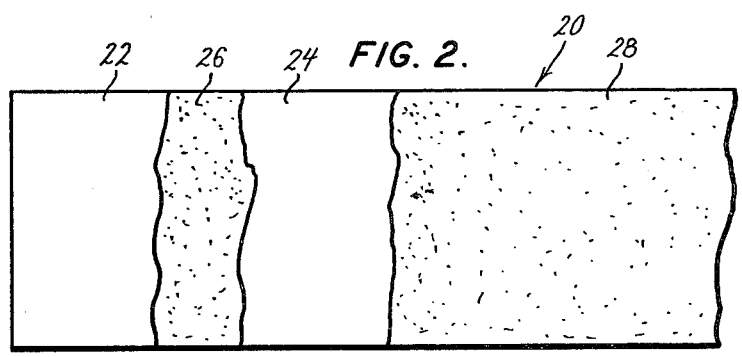
FIG. 2 is a top view of applicant's tape with portions broken away to expose the multiple layers thereof.
Figure 3:
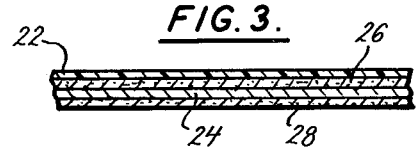
FIG. 3 is an enlarged cross-sectional view of applicant's tape with the thickness of each layer exaggerated for purposes of clarity.

Applicant's multiple layer laminated tape 20 includes an upper strength layer 22 laminated to a lower or bottom carrier layer 24 by an adhesive layer 26 therebetween. The carrier layer 24 has a layer of gumming 28 applied thereto which serves to secure the entire tape 20 to the article 30 being sealed. The gumming 28 may be any suitable type, such as vegetable, animal, or even pressure sensitive types of adhesive; although convenience and dispensability are enhanced with water soluble adhesive.

The upper strength layer 22 may be formed from a film of pre-stretched and oriented polypropylene or high density polyethylene plastic. This plastic film provides a substantially smooth and thin layer of strengthening material to form the body of the tape. The laminating adhesive 26 may be any adhesive as is commonly used for gluing plastic films to paper, as is known in the art. The carrier layer 24 may be thirty pound (13.6 kg) to sixty pound (27.2 kg) Kraft or the like. As the carrier layer 24 is laminated to the strength layer 22, the strength layer 22 provides virtually all the necessary strength required to withstand the forces encountered during use. The carrier layer 24 serves only as a medium to "carry" the water soluble adhesive that otherwise could not be applied onto the plastic layer, and to provide the longitudinal rigidity to permit the tape 20 to be dispensed. Thus, the carrier layer 24 may be thin as well and serve to further decrease the overall thickness of the tape 20 when compared with that of the prior art.

Figure 4:
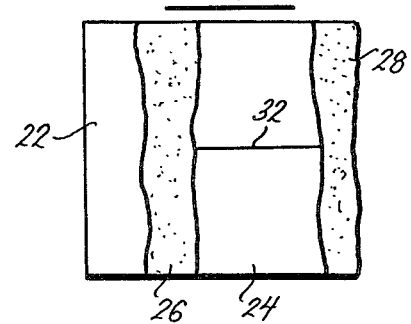
FIG. 4 is a top view of an alternate embodiment of applicant's tape with portions broken away to expose the medial slit in the lower carrier layer.

In the alternate embodiment shown in FIG. 4, the previously mentioned optional medial cut or incision 32 along the longitudinal length of the carrier layer 24 that may extend at least substantially through the thickness thereof has been illustrated.

Because of applicant's unique design, his laminated tape 20 may be dispensed from a tape dispensing machine (not shown) which would automatically moisten and cut the tape 20 to length. When it is desired to break the seal formed between the flaps 34, then the strength layer 22 is peeled back in a longitudinal direction. The significantly greater strength of the strength layer 22 makes it virtually impossible to tear it before it has been completely removed from the carrier layer 24. This helps prevent an incomplete stripping or delamination which would be inconvenient and time consuming in breaking the seal.

After the strength layer 22 has been delaminated, the portion of the carrier layer 24 that remains may be easily broken apart along the edge of the seal to complete the separation process. In applicant's alternate embodiment, the medial cut 32 would complete this final step automatically as the strength layer 22 is stripped so that the seal would be immediately broken as the strength layer 22 is stripped away.

Various changes and modifications would be apparent to one of ordinary skill in the art. These changes and modifications should be considered as part of applicant's invention which is limited only by the scope of the claims appended hereto.

I claim:

1. A thin strippable tape for such use as sealing carton tops together, comprising a thin film of strong plastic material to provide a strength layer, a weak, thin carrier layer united on one side to the strength layer, and a water-soluble adhesive film on the opposite side of the carrier layer; the strength layer of plastic material being non-rigid, flexible and floppy, and hence unable to be dispensed lengthwise from a tape dispenser, and the plastic being unable to hold a coating of water-soluble adhesive, the carrier layer being of thin paper-like material continuous and unbroken laterally across the strength layer, the carrier material being capable of holding a water-soluble adhesive, and also of being united to the plastic film, the plastic film and the carrier layer when thus united having sufficient stiffness to enable the resulting tape to be fed lengthwise from a tape dispenser; and the adhesive film being on the exposed face of the carrier opposite the plastic film, the strength layer being of plastic material strong enough to be stripped from an object such as carton flaps to which the tape has been applied, and the carrier layer being of material so weak that when the tape is stripped from the object upon which it is adhered, any parts of the carrier remaining on the object are readily breakable to permit the carton flaps to be easily separated.

2. The tape of claim 1 wherein the carrier layer is made of low internal bond paper so that at least partial separation of said carrier layer is to be expected as the strength layer is delaminated therefrom.

3. The tape of claim 1 wherein the strength layer is made of oriented polypropylene.

4. The tape of claim 1 wherein the strength layer is made of high density polyethylene.

5. The tape of claims 3 or 4 wherein the carrier layer is made of Kraft paper or the like.

* * * * *